US 8,045,543 B2

(12) United States Patent
Camp, Jr. et al.

(10) Patent No.: US 8,045,543 B2
(45) Date of Patent: Oct. 25, 2011

(54) METHODS AND APPARATUS FOR SUPPLYING ALTERNATIVE CONTACT INFORMATION IN A COMMUNICATION SYSTEM

(75) Inventors: William O. Camp, Jr., Chapel Hill, NC (US); Leland Scott Bloebaum, Cary, NC (US); Yojak Harshad Vasa, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 755 days.

(21) Appl. No.: 12/130,053

(22) Filed: May 30, 2008

(65) Prior Publication Data
US 2008/0311951 A1 Dec. 18, 2008

Related U.S. Application Data

(60) Provisional application No. 60/944,393, filed on Jun. 15, 2007.

(51) Int. Cl.
*H04B 7/216* (2006.01)
(52) U.S. Cl. .................. 370/352; 455/552.1; 455/412.2
(58) Field of Classification Search ............... 455/552.1, 455/412.2, 411; 370/352, 395.2
See application file for complete search history.

(56) References Cited

U.S. PATENT DOCUMENTS

| | | | |
|---|---|---|---|
| 6,922,721 B1 | 7/2005 | Minborg | |
| 6,977,909 B2 | 12/2005 | Minborg | |
| 6,996,072 B1 | 2/2006 | Minborg | |
| 2005/0271041 A1* | 12/2005 | Minborg et al. | 370/352 |
| 2006/0114845 A1 | 6/2006 | Minborg | |

FOREIGN PATENT DOCUMENTS

| | | |
|---|---|---|
| EP | 0924916 A2 | 6/1999 |
| EP | 1035744 A2 | 9/2000 |
| WO | 96/27997 | 9/1996 |
| WO | 99/33199 | 7/1999 |
| WO | 0184812 A2 | 11/2001 |

OTHER PUBLICATIONS

Turner K. J., et al. "Policies and Conflicts in Call Control." Computer Networks, Elsevier Science Publishers BV, Amsterdam, Netherlands, vol. 51, No. 2, Nov. 10, 2006, pp. 496-514. XP005758514.
PCT—International Search Report dated Sep. 15, 2008, for Application No. PCT/US2008/066702, Filed Jun. 12, 2008.
Office Action issued Nov. 29, 2010 in corresponding EP Application No. 08 770 833.5 filed Dec. 9, 2009.
U.S. Appl. No. 11/786,971, filed Jun. 27, 2007 titled "Method for Distributing Programs over a Communication Network".
U.S. Appl. No. 11/872,151, filed Oct. 15, 2007 titled "System, Method, and Devices for Allocating Communications-Related Charges".

* cited by examiner

*Primary Examiner* — Phuoc Doan
(74) *Attorney, Agent, or Firm* — Coats & Bennett, P.L.L.C.

(57) ABSTRACT

A technique for supplying alternative contact information when a communication attempt is unsuccessful is described. The technique comprises receiving an inquiry that includes an indication of an unsuccessful communication attempt and an identifier or address for the target of the failed communication attempt. Next, it is determined whether the identifier or address is associated with a group. If so, a response is generated, the response including one or more other identifiers or addresses associated with the group. Finally, the generated response is transferred in response to the inquiry.

9 Claims, 4 Drawing Sheets

METHODS AND APPARATUS FOR SUPPLYING ALTERNATIVE CONTACT INFORMATION IN A COMMUNICATION SYSTEM

RELATED APPLICATIONS

The present application claims priority under 35 U.S.C. Section 119(e) to U.S. Provisional Patent Application Ser. No. 60/944,393, filed 15 Jun. 2007, the entire contents of which are incorporated by reference herein.

TECHNICAL FIELD

The present invention relates generally to a method and apparatus for exchanging information in a communication system. More specifically, the invention relates to methods and apparatus for supplying alternative information when a communication attempt is unsuccessful.

BACKGROUND

With the convergence of voice and data communication networks, portable communication devices are increasingly likely to support several communication modes, as well as a number of communication-related applications. Single-purpose cellular phones and alphanumeric pagers have given way to complex mobile devices supporting voice communications, e-mail, and instant messaging. A typical device often includes a camera, a music player, and sound recorder, and may include a global positioning system (GPS) receiver. Many of these devices and their supporting wireless networks now enable simultaneous use of multiple communication modes. Thus, a device user today might engage in a voice call and simultaneously send or receive text messages, digital images, video clips, or the like.

A few applications have been developed to take advantage of this simultaneous availability of multiple communication modes. In particular, several patents and patent application publications describe a so-called Phone Pages system, in which the generation and transfer of multimedia data objects is triggered by various communication-related events. These data objects, or Phone Pages, thus supplement a primary communication session, such as a voice call, an e-mail exchange, or an instant message conversation. The Phone Pages concept is described in the following patents and patent application publications, the contents of which are each incorporated by reference herein: U.S. Pat. No. 6,922,721, titled "Exchange of Information in a Communication System" and issued on Jul. 26, 2005 to Minborg et al.; U.S. Patent Application Publication 2005/0271041 A1, titled "Exchange of Information in a Communication System" and filed on Jun. 1, 2005 by Minborg et al.; U.S. Pat. No. 6,996,072, titled "Method and Apparatus for Exchange of Information in a Communication Network" and issued on Feb. 7, 2006 to Minborg; U.S. Pat. No. 6,977,909, titled "System and Method for Exchange of Information in a Communication Network" and issued on Dec. 20, 2005 to Minborg; and U.S. Patent Application Publication 2006/0114845, also titled "System and Method for Exchange of Information in a Communication network" and filed on Nov. 14, 2005 by Minborg.

The communication techniques and systems described in the preceding references provide a variety of enhancements to conventional modes of communication, facilitating the convenient exchange of various data objects between users of communication devices. These enhancements may be quite valuable both for promoting personal relationships and for supporting business and enterprise communications. However, further enhancements to ensure that appropriate data objects are transferred at appropriate times are needed.

SUMMARY

As noted above, improved techniques for regulating the automatic transfer of data objects in communication systems are needed. In particular, current systems and methods do not provide adequate means for supplying alternative contact information when a communication attempt is unsuccessful.

An exemplary method according to some embodiments of the present invention comprises receiving an inquiry comprising an indication of an unsuccessful communication attempt and an identifier or address corresponding to the target of the failed communication attempt. Next, it is determined whether the identifier or address supplied in the inquiry is associated with a group. This group may comprise several data objects including information corresponding to alternative means for communicating with the target of the failed communication attempt, or for communication with associates of the target. If the identifier or address supplied in the inquiry is associated with a group, then a response to the inquiry is generated, the response comprising alternative identifiers or addresses for communication. This response is transferred, in some cases directly to the device that originated the initial communication attempt.

In another embodiment of the various systems and methods described herein, a server for supplying alternative contact information when a communication attempt is unsuccessful is provided. The server includes processing logic configured to carry out one or more of the methods described herein. In particular, the processing logic may be configured to receive an inquiry comprising an indication of an unsuccessful communication attempt and an identifier or address of to which the communication attempt was made and to determine if the identifier or address is associated with a group. If the identification or address is associated with a group, the processing logic generates a response that includes one or more other identifiers or addresses associated with the group and transfers the generated response.

In still another embodiment of the various systems and methods described herein, a computer-readable medium comprising a computer program for supplying alternative contact information when a communication attempt is unsuccessful is provided. The computer software stored on the computer-readable medium is executable to perform: receiving an inquiry comprising an indication of an unsuccessful communication attempt and an identification or address of to which the communication attempt was made; determining if the identification or address is associated with a group; if the identification or address is associated with a group, generating a response that includes other identifications or addresses associated with the group; and transferring the generated response.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

The invention will now be more thoroughly described and features and advantages will become readily apparent by reading the following detailed description, where references will be made to the accompanying figures, where.

DETAILED DESCRIPTION

The present invention is described below in reference to a wireless telecommunications system providing voice and data services to a mobile device. Various systems providing voice and data services have been deployed, such as GSM networks (providing circuit-switched communications) and GPRS (providing packet-switched communications); still others are currently under development. These systems may employ any or several of a number of wireless access technologies, such as Time Division Multiple Access (TDMA), Code Division Multiple Access (CDMA), Frequency Division Multiple Access (FDMA), Orthogonal Frequency Division Multiple Access (OFDMA), Time Division Duplex (TDD), and Frequency Division Duplex (FDD). The present invention is not limited to any specific type of wireless communication network or access technology. Indeed, those skilled in the art will appreciate that the network configurations discussed herein are only illustrative. The inventive techniques disclosed herein may be applied to "wired" devices accessing conventional voice or data networks, as well as wireless devices. The invention may be practiced with devices accessing voice and/or data networks via wireless local area networks (WLANs) or via one or more of the emerging wide-area wireless data networks, such as those under development by the 3rd-Generation Partnership Project (3GPP).

Figure 1:
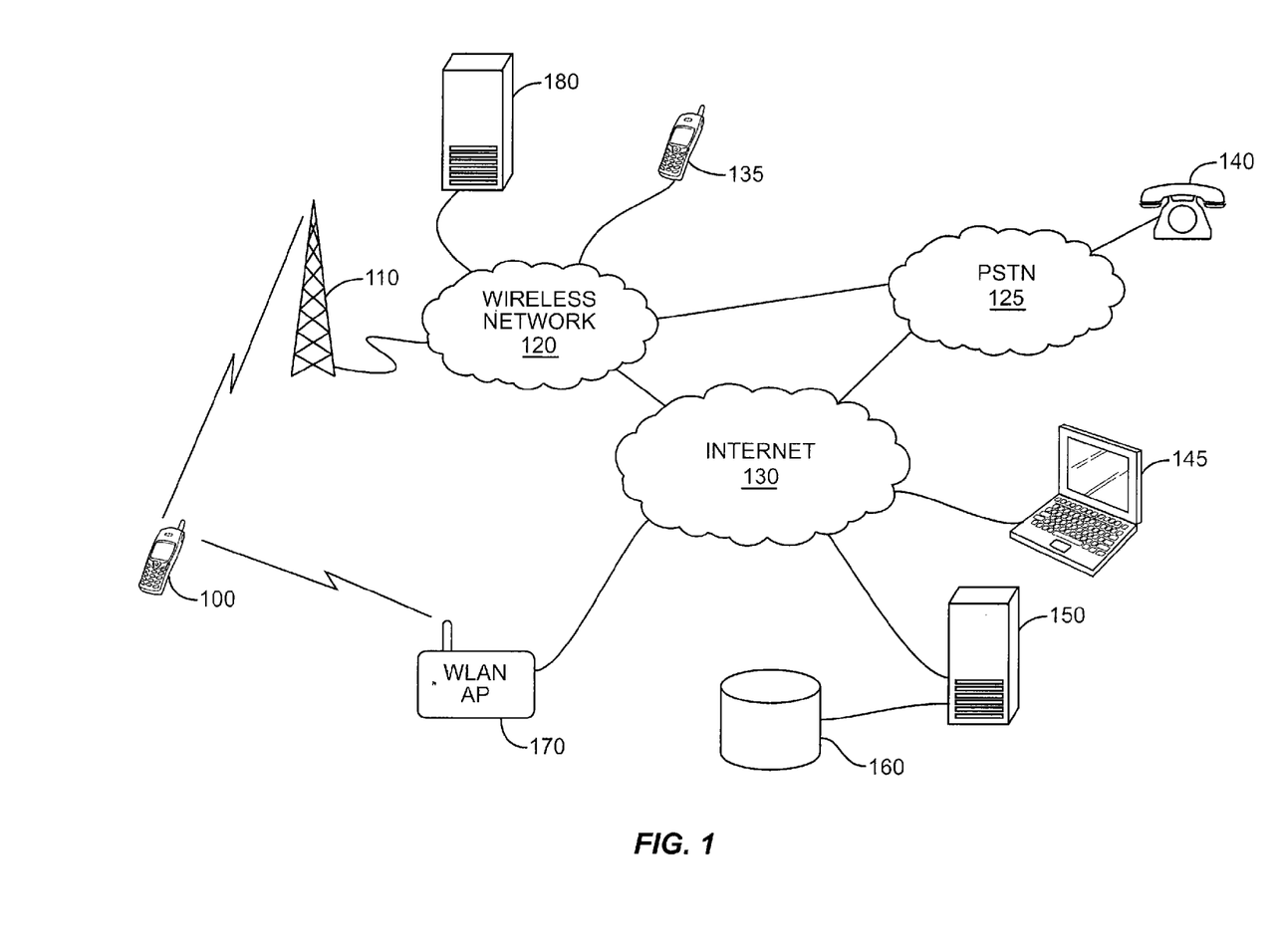
FIG. 1 illustrates an overview of a communication infrastructure overview according to one embodiment of the invention.

FIG. 1 illustrates an exemplary communication system in which the present invention may be employed. Communication device 100 communicates with other devices through base station 110, which is connected to wireless network 120. Wireless network 120 is in turn connected to the Public Switched Telephone Network (PSTN) 125 and the Internet 130. Wireless device 100 can thus communicate with various other devices, such as wireless device 135, conventional landline telephone 140, or personal computer 145. In FIG. 1, wireless device 100 also has access to data server 150 via the Internet 130; data server 150 may be configured to provide access through Internet 130 to data or applications stored in storage device 160. Storage device 160 may comprise one or more of a variety of data storage devices, such as disk drives connected to data server 150 or one or more other servers, a Redundant Array of Independent Drives (RAID) system, or the like.

Communication device 100 may be a cordless telephone, cellular telephone, personal digital assistant (PDA), communicator, computer device, or the like, and may be compatible with any of a variety of communications standards, such as the Global System for Mobile Communications (GSM) or one or more of the standards promulgated by 3GPP. Communication device 100 may include a digital camera, for still and video images, as well as a digital sound recorder and digital music player application. Communication device 100 may also support various applications in addition to voice communications, such as e-mail, text messaging, picture messaging, instant messaging, video conferencing, web browsing, and the like.

Communication device 100 also includes a wireless local-area network (WLAN) transceiver configured for communication with WLAN access point 170. WLAN access point 170 is also connected to Internet 130, providing communication device 100 with alternative connectivity to Internet-based resources such as data server 150.

Also connected to wireless network 120 is location server 180. Location server 180 is typically maintained by the operator of wireless network 120, but may be separately administered. The main function of location server 180 is to determine the geographic location of mobile terminals (such as mobile terminal 100) using the wireless network 120. Location information obtained by location server 180 may range from information identifying the cell currently serving mobile terminal 100 to more precise location information obtained using Global Positioning System (GPS) technology. Other technologies, including triangulation methods exploiting signals transmitted from or received at several base stations, may also be used to obtain location information. Triangulation techniques may include Time Difference of Arrival (TDOA) technology, which utilizes measurements of a mobile's uplink signal at several base stations, or Enhanced-Observed Time Difference (E-OTD) technology, which utilizes measurements taken at the mobile terminal 100 of signals sent from several base stations GPS-based technologies may include Assisted-GPS, which utilizes information about the current status of the GPS satellites derived independently of the mobile terminal 100 to aid in the determination of the terminal's location.

In some embodiments, the various systems and methods described herein facilitate the selective delivery of data objects to a communication device, such as mobile terminal 135, in communication with another device, such as mobile terminal 100. The data object may be transferred from one device to the other, e.g., from mobile terminal 100 to mobile terminal 135, or from a data object server, such as server 150 or server 180, in response to a request from either of the communication devices.

Typically, the users of the communication devices are engaged in a communication session, which may comprise a voice call (whether circuit-switched or packet-switched), an instant message (IM) session, or any other modes of communication such as those described herein or combinations thereof. In some embodiments, one or both of the communication devices may include a module or application that is able to determine the occurrence of a communications-related trigger event in the communication device and to thereafter transmit and/or receive data, such as data specifically related to the trigger event. The trigger event may comprise, for example, any of the following events or combinations thereof:

the establishment of a session or call between the devices;
the arrival or departure of a device in a multi-party communication session;
activation by the user of one or both of the communication devices (e.g., an explicit request by one user for transfer of a data object to the other);
timer-based periodic or random trigger event in communication device;
crossing a geographic boundary, such as a boundary established by the user of one of the communication devices; or
other events related to the communication, such as those described in U.S. Pat. No. 6,996,072.

Other trigger events might include, but are not limited to:
An outgoing call is or is about to be initiated.
A called party answers a call.
A called party is busy.
A called party does not answer after a pre-determined time or number of rings.
A called party rejects a call.
A called party is unavailable (e.g., an addressed mobile phone is out of coverage).
An incoming call is imminent or has just started.
A conference call is or is about to be initiated.
A call is disconnected.
A call is conducted (under which several triggering events can be generated).
A party is placed on hold.
The location of a party has changed.
A communication device is switched on or off.
A special-function button is pressed on a communication device.
A button or other user interface device is activated in response to a query.
A voice mail, text message, e-mail, instant message, or the like is received.
A voice mail, text message, e-mail, instant message, or the like is received.

While many of the preceding trigger events are related to traditional voice communications, those skilled in the art will appreciate that many analogous trigger events will apply to other communication modes, such as instant messaging, e-mail, video conferencing, "chat" sessions, and so on.

The various systems, devices and methods described herein provide the ability to supply alternative contact information when a communication attempt is unsuccessful. While the provision of alternative contact information will be described below in the context of circuit-switched voice communications, the embodiments described below are applicable for use with any other mode of communication such as those described herein, including circuit-switched data communications, Voice-Over-Internet-Protocol (VoIP) communications, instant messaging, video conferencing, and the like.

A communication attempt may be unsuccessful for a number of different reasons. For example, in the context of a circuit-switched voice communications, a call would be unsuccessful if the called device fails to answer, is busy, or if the call is denied, etc. In the event of an unsuccessful communication attempt, it is desirable to provide the caller with alternative contact information for the called party, in order to assist the caller in successfully reaching the called party.

Figure 2:
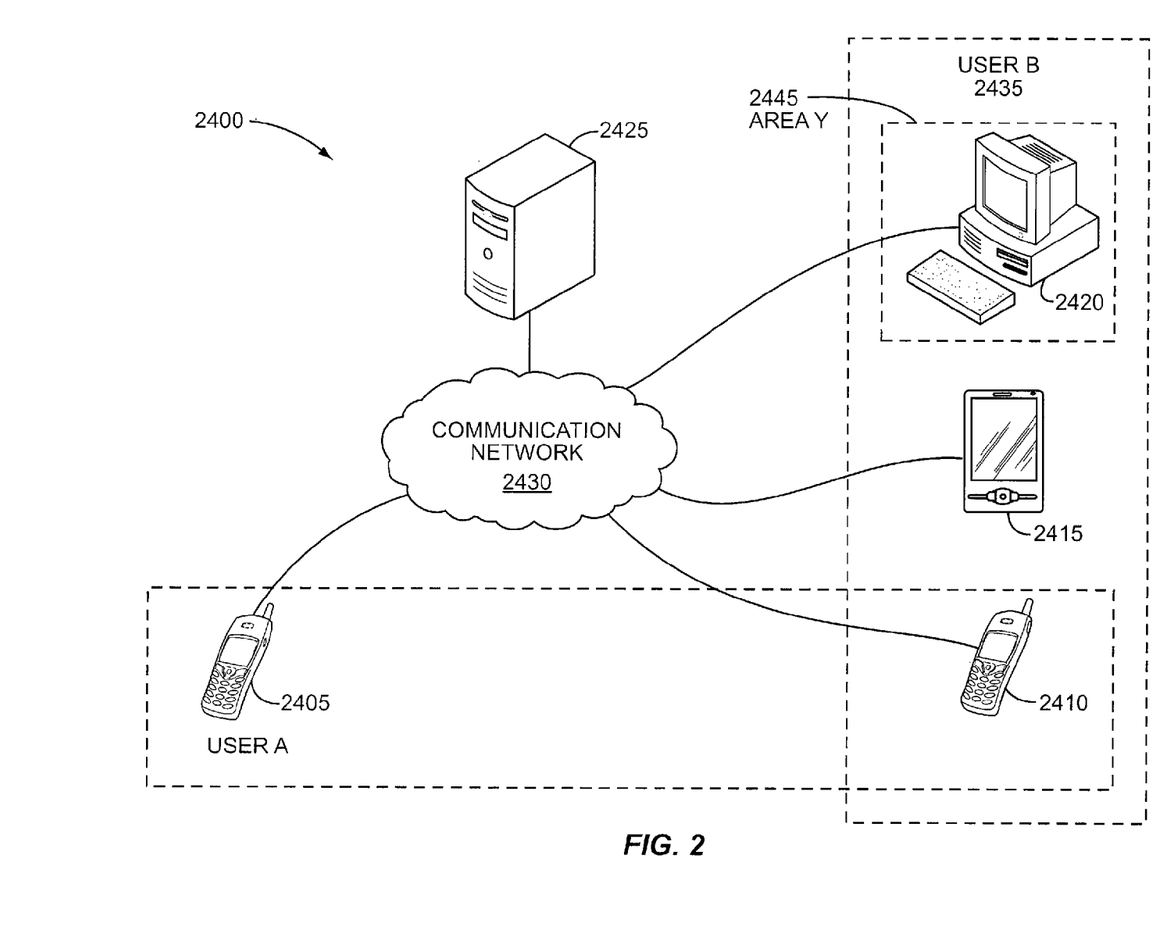
FIG. 2 provides a simplified view of a system for supplying alternative contact information when a communication attempt is unsuccessful.

FIG. 2 illustrates a system 2400 depicting a first communication device 2405 associated with a User A; second through fourth communication devices 2410, 2415, and 2420 associated with a User B; a data object server 2425; and a communications network 2430. First communication device 2405 will hereafter be referred to as User A's device 2405, and second through fourth communication devices 2410-2420 will hereafter be referred to as User B's device(s) 2410-2420. User B's device(s) 2410-2420 are members of Group 2435. Further, User A's device 2405 and User B's device(s) 2410 and 2415 are physically located in Area X 2440 and User B's device 2420 is located in Area Y 2445. User A's device 2405, User B's device(s) 2410-2420 and data object server 2425 communicate via communications network 2430. While not illustrated, data object server 2425 may communicate with other devices in order to obtain information, such as information contained in a user profile or location information corresponding to an originating or destination entity or device.

The arrangement of elements depicted in FIG. 2 is merely exemplary. For example, the three devices shown as User B's device(s) 2410-2420 are intended to represent a plurality of devices that are active or ready to receive communication; the target devices in various embodiments of the present invention are not limited to the types or number shown. Further, any number of the three devices shown as User B's device(s) 2410-2420 may belong to another user or users associated in some way with User B. Still further, communications network 2430 may be embodied using a plurality of networks of one or more types. Accordingly, those of ordinary skill in the art will recognize that various changes and modifications of the system illustrated in FIG. 2 and described herein can be made without departing from the scope of the invention. Also, descriptions of well-known functions and constructions are omitted for clarity and conciseness.

In some embodiments, User A's and User B's device(s) 2405-2420 may comprise any of the User Equipments (UE) described in this application, such as, for example, UE 100 of FIG. 1, and data object server 2425 may comprise any of the servers described herein, such as servers 150 and 180 of FIG. 1 or any of the other servers described herein.

In some embodiments of the present invention, data object server 2425 receives an inquiry after a communication attempt with a destination entity or device fails. In response to the inquiry, data object server 2425 provides alternative contact information for the destination entity or device, based on the information included in the inquiry. The inquiry may originate from the originating entity or device that initiated the communication attempt or from any other entity or device associated with the attempted communication. The inquiry and information contained therein will be described in greater detail below.

In FIG. 2, User B's devices 2410-2420 are illustrated as belonging to group 2435. In some embodiments, data object server 2425 stores or has access to data objects that are linked together as a group. A group of data objects is a collection of data objects of which one or more are to be provided in the event that the use of another one of the data objects within the group in an attempted communication is unsuccessful.

Exemplary groupings include plural contact information for the called party, contact information for members of a department within a company, contact information for members of immediate friends or family, businesses that have a similar services, consumer devices disposed at a common location, etc. The contact information may be contact information for any of a number of different means to contact the called party including VoIP IP addresses, email addresses, IP routing tables, temporary IP addresses within a company LAN or a coffee shop LAN, etc. Accordingly, data object server 2425 contains or has access to group information that associates the number or address of User B's device(s) 2405-2420 with group 2435.

The group information may be stored in data object server 2425 using any of various implementations. In one implementation, the data objects stored within data object server 2425 each include one or more identifiers of any group it is associated with. In another implementation, the data objects stored in data object server 2425 may be stored according to their group membership. In yet another implementation, data object server 2425 may store group member information separate from the data objects. In this implementation, the group member information may be stored as either lists or tables of members of respective groups or as a matrix. In still another implementation, data object server 2425 does not store group information and may instead determine a group from information received in the inquiry, information received from another source and information related to the data objects stored therein. In this implementation, a matching or ranking algorithm or any other mechanism known in the art may be used to determine members of the group. Further, the group information may be stored in any other manner as would be appreciated by those of skill in the art. If the group information is stored separately from the data objects, then the group information may be stored externally to the data object server 2425.

In some embodiments, the group information may include one or more category elements that define the group. The implementation of category elements is beneficial in that it adds greater control on how a group is defined. For example, a called party may be associated with a first and second group of telephone numbers wherein each of the first and second groups is associated with a different category element. Exemplary category elements include the an identification or address of the originating user or device, time, date, contact category such as "work" or "home", location or any other condition.

The group information or the matching mechanism stored in data object server 2425 may be set up and managed by any of a number of different entities such as a user, network operator, IT administrator or the like. For example, a user may update his group information or any category elements associated therewith.

Accordingly, in the system 2400, if User B has previously established the linkage of the numbers or addresses for User B's device(s) 2410-2420 in data object server 2425, then an inquiry to data object server 2425 will result in the response from data object server 2425 including the numbers or addresses for devices 2415 and 2420 as alternative numbers to try to reach User B. This methodology is described in further detail below.

Figure 3:
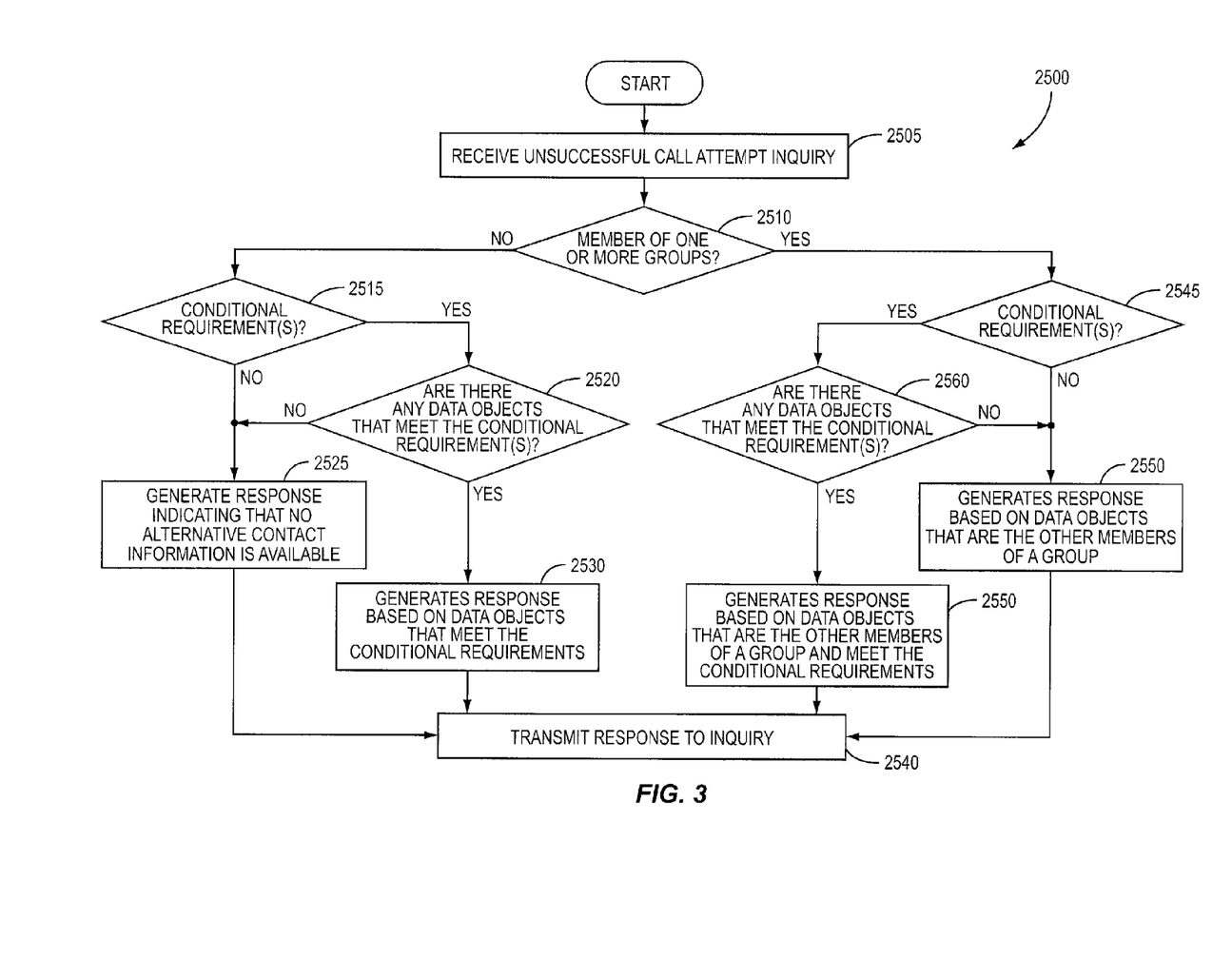
FIG. 3 is a logic flow diagram illustrating an exemplary method for supplying alternative contact information when a communication attempt is unsuccessful.

FIG. 3 illustrates an embodiment of a method 2500 for supplying alternative contact information when User A's attempt to communicate with User B is unsuccessful. In step 2505, the data object server receives an inquiry that was sent in response to User A's unsuccessful attempt to communicate with User B via device 2410. The inquiry may originate from User A's device or another entity in communication network 2430 that is associated with the call attempt from User A to User B. The inquiry includes an indication of the failed communication attempt and an address or identifier of the destination of the attempted communication, which in this case is User B's device 2410.

An exemplary inquiry might appeal as "PPReg['failed call', User B]". This exemplary inquiry includes two items of information, including an indication of a failed attempted communication and an identification of the destination entity or device. The inquiry may further include one or more conditional requirements. Conditional requirements are similar to the category elements discussed above. However, while category elements are stored with the group information and are used to define a group, conditional requirements are included in the inquiry and are used to obtain a more tailored response to the inquiry. Thus, an exemplary inquiry including a conditional element might appear as "PPReg['failed call', User B, Area X]". This exemplary inquiry includes three items of information, including an indication of a failed attempted communication, an identification of the destination entity or device and a conditional requirement specifying an area. In this case, the conditional requirement is that the alternative contact information be limited to numbers or addresses for a user or device in Area X. When a conditional requirement is included in the inquiry, the inquiry may further include additional information to facilitate the conditional requirement. For example in the inquiry "PPReg['failed call', User B, radius of interest, location of User A]", the radius of interest is the conditional requirement and the location of User A is the additional information. However, in the above example, the location of User A may alternatively be obtained by data object server 2425, for example by requesting the location from the location server 180 of FIG. 1.

After receiving the inquiry in step 2510, the data object server 2425 determines if User B's device 2410 is a member of at least one group. In determining if User B's device 2410 is a member of at least one group, data object server 2425 uses any information available to it, including any information contained in the inquiry, to determine if User B's device 2410 is a member of at least one group with respect to the communication attempt. In making this determination, data object server 2425 considers any category elements associated with group information. If data object server 2425 determines that User B's device is not a member of a group, data object server 2425 in step 2515 determines if the inquiry includes any conditional requirements. If the inquiry does not include any conditional requirements, data object server 2425 in step 2525 generates a response indicating that there is no alternative contact information available. In step 2540, data object server 2425 transmits the generated response.

Returning to step 2515, if data object server 2425 determines that at least one conditional requirement is included in the inquiry, then data object server 2425 in step 2520 determines if any data objects stored therewith or accessible thereto meet the at least one conditional requirement. If it is determined in step 2520 that there are no available data objects that meet the at least one conditional requirement, the method proceeds to step 2525. However, if it is determined in step 2520 that there is at least one available data object that meets the at least one conditional requirement, data object server 2425 generates a response in step 2530, including the one or more data objects that meet the at least one conditional requirement as alternatives to try to communicate with User B. Next, the generated response is transmitted in step 2540.

Returning to step 2510, if the data object server 2425 determines that User B's device 2410 is a member of at least one group with respect to the communication attempt, the method proceeds to step 2545. In step 2545, data object server 2425 determines if the inquiry includes any conditional requirements. If the inquiry does not include any conditional requirements, data object server 2425 in step 2550 generates a response including the data objects, other than User B's device, that are members of the same group. These data objects may each provide information corresponding to an alternative means for communicating with User B or associates of User B. In step 2540, data object server 2425 transmits the generated response.

Returning to step 2545, if data object server 2425 determines that at least one conditional requirement is included in the inquiry, then data object server 2425 in step 2560 determines if any data objects that are members of the at least one group also meet the at least one conditional requirement. If it is determined in step 2560 that there are no data objects that are members of the at least one group that meet the at least one conditional requirement, then the method proceeds to step 2550. However, if it is determined in step 2560 that there is at least one data object that are members of the at least one group that meets the at least one conditional requirement, then data object server 2425 generates a response in step 2565. This response includes the one or more data objects of the members of the at least one group that meet the at least one conditional requirement. Again, these data objects may provide information for alternative means for communicating with User B or User B's associates. Finally, the generated response is transmitted in step 2540.

Figure 4:
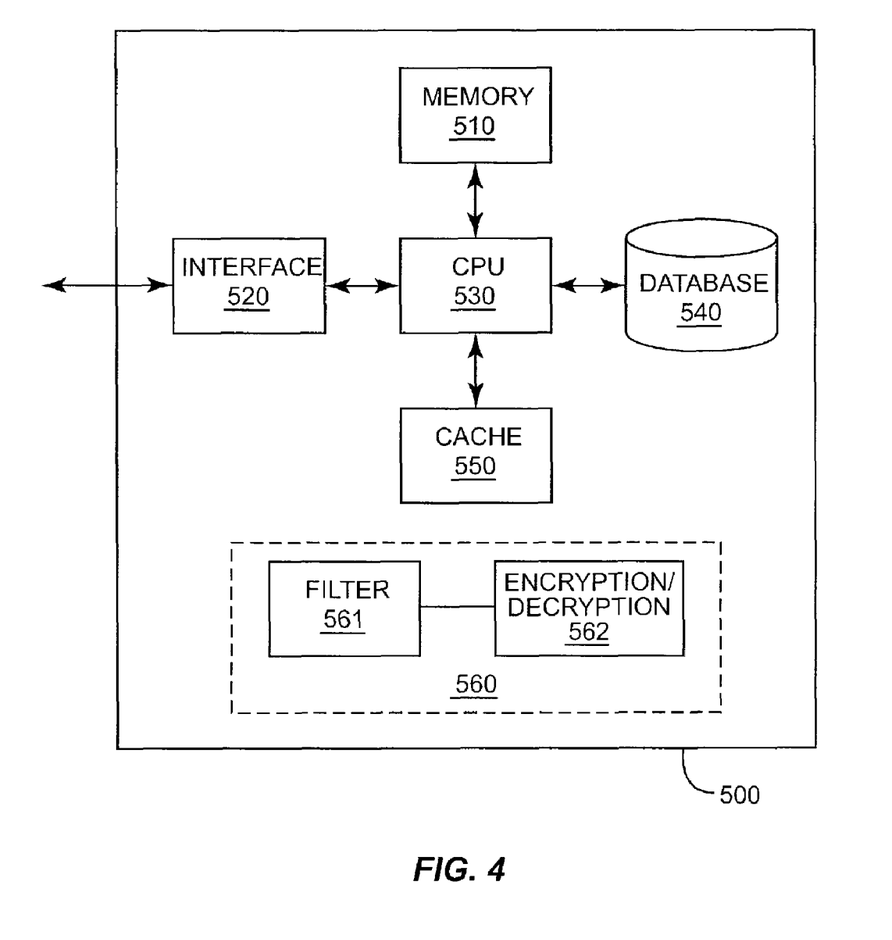
FIG. 4 is a block diagram illustrating an exemplary data object server.

FIG. 4 illustrates an exemplary server 500 according to one or more embodiments of the present invention. Server 500 comprises at least one CPU 530 connected to at least one memory device 510, a cache memory 550, at least one database 540 and at least one network interface 520. Memory devices 510 and databases 540 may include non-volatile memory, such as flash, magnetic, or optical storage devices. Network interface 520 enables the CPU 530 to send and receive data to/from the data network 130. The cache memory 550 allows storage of frequently used data objects so that the CPU 530 may obtain them readily. The database 540 may include the actual data objects that can be requested by a communication device, such as communication device 100, via, for example, the wireless network 120 and Internet 130 pictured in FIG. 1. The data object server may further comprise a number of programs 560 including, but not limited to, a filter 561, allowing the data objects to be optimized according to the rendering capabilities of the communication device 400, and an encryption/decryption engine 562, allowing data object requests to be decrypted and data objects to be encrypted.

In some embodiments of the present invention, server 500 is configured to carry out one or more of the methods described above. In particular, server 500 may comprise processing logic (e.g., CPU 530, configured with appropriate software) configured to receive an inquiry comprising an indication of an unsuccessful communication attempt and an identifier or address corresponding to the destination of the failed communication attempt and to determine if the identifier or address is associated with a group. The processing logic may be further configured to generate a response that includes one or more other identifiers or addresses associated with the group, if the identifier or address is associated with a group, and to transfer the generated response in response to the inquiry.

Those skilled in the art will appreciate that the various functions of server 500 may be performed using various combinations of hardware and software. Accordingly, each of the described processing blocks may in some embodiments directly correspond to one or more commercially available or custom microprocessors, microcontrollers, or digital signal processors. In other embodiments, however, two or more of the processing blocks or functional elements of server 500 may be implemented on a single processor, while functions of other blocks are split between two or more processors. Likewise, memory 510 is representative of the one or more memory devices containing the software, firmware, and data used to implement server functionality in accordance with one or more embodiments of the present invention. Thus, these memory devices may include, but are not limited to, the following types of devices: cache, ROM, PROM, EPROM, EEPROM, flash, SRAM, and DRAM.

Those skilled in the art should appreciate that the present invention broadly provides methods and apparatus for supplying alternative contact information when a communication attempt is unsuccessful. The present invention may, of course, be carried out in other specific ways than those herein set forth without departing from the scope and essential characteristics of the invention. Thus, the present invention is not limited to the features and advantages detailed in the foregoing description, nor is it limited by the accompanying drawings. Indeed, the present invention is limited only by the following claims, and their legal equivalents.

What is claimed is:

1. A method for supplying alternative contact information when a communication attempt is unsuccessful, comprising:
   receiving an inquiry from a communication device, the inquiry comprising an indication of an unsuccessful communication attempt and an identifier or address corresponding to the destination of the failed communication attempt;
   determining if the identifier or address is associated with a group;
   if the identifier or address is associated with a group, generating a response that includes one or more other identifiers or addresses associated with the group; and
   transferring the generated response to the communication device;
   wherein the inquiry further includes a conditional requirement, and wherein the method further comprises, if the identifier or address is not associated with a group, generating a response that includes one or more other identifiers or addresses that meet the conditional requirement.

2. The method of claim 1, wherein the inquiry further comprises a category element, and wherein determining if the identifier or address is associated with a group comprises determining whether group information corresponding to the category element is available.

3. The method of claim 1, wherein the inquiry further designates an area, and wherein determining if the identifier or address is associated with a group comprises determining whether one or more other identifiers or addresses correspond to the designated area.

4. The method of claim 1, wherein the inquiry is received from an originating device, and wherein the generated response is transferred to the originating device.

5. A server for supplying alternative contact information when a communication attempt is unsuccessful, comprising processing logic configured to:
   receive an inquiry comprising an indication of an unsuccessful communication attempt and an identifier or address corresponding to the destination of the failed communication attempt;
   determine if the identifier or address is associated with a group;
   if the identifier or address is associated with a group, generate a response that includes one or more other identifiers or addresses associated with the group; and
   transfer the generated response;
   wherein the inquiry further includes a conditional requirement, and wherein the processing logic is further configured to generate a response that includes one or more other identifiers or addresses that meet the conditional requirement, if the identifier or address is not associated with a group.

6. The server of claim 5, wherein the inquiry further comprises a category element, and wherein the processing logic is configured to determine if the identifier or address is associated with a group by determining whether group information corresponding to the category element is available.

7. The server of claim 5, wherein the inquiry further designates an area, and wherein the processing logic is configured to determine if the identifier or address is associated with a group by determining whether one or more other identifiers or addresses correspond to the designated area.

8. The server of claim 5, wherein the inquiry is received from an originating device, and wherein the processing logic is configured to transfer the generated response to the originating device.

9. A non-transitory computer-readable medium encoded with computer software executable by a server to perform:
   receiving an inquiry comprising an indication of an unsuccessful communication attempt and an identifier or address corresponding to the destination of the failed communication attempt;
   determining if the identifier or address is associated with a group;

if the identifier or address is associated with a group, generating a response that includes one or more other identifiers or addresses associated with the group; and transferring the generated response;
wherein the inquiry further includes a conditional requirement, and wherein the method further comprises, if the identifier or address is not associated with a group, generating a response that includes one or more other identifiers or addresses that meet the conditional requirement.

* * * * *